United States Patent
Fischperer

[11] Patent Number: 6,087,790
[45] Date of Patent: Jul. 11, 2000

[54] SECTION SWITCHING PROCESS FOR RAILWAY SYSTEMS WITH A LONG STATOR LINEAR MOTOR

[75] Inventor: Rolf Fischperer, Berlin, Germany

[73] Assignee: Siemens Aktiengesellschaft, Munich, Germany

[21] Appl. No.: 09/202,246

[22] PCT Filed: Jun. 3, 1997

[86] PCT No.: PCT/DE97/01108

§ 371 Date: Dec. 10, 1998

§ 102(e) Date: Dec. 10, 1998

[87] PCT Pub. No.: WO97/47493

PCT Pub. Date: Dec. 18, 1997

[30] Foreign Application Priority Data

Jun. 13, 1996 [DE] Germany .......................... 196 23 670

[51] Int. Cl.[7] .................................................. H02K 41/00
[52] U.S. Cl. ........................................... 318/135; 104/292
[58] Field of Search ................................. 310/12, 13, 14; 318/135; 104/292

[56] References Cited

FOREIGN PATENT DOCUMENTS 41 30 779  3/1993  Germany .
195 05 963  9/1995  Germany .

OTHER PUBLICATIONS

Jürgen Meins, "Energieversorgung des Langstatorantriebs," (Power Supply of the Long–Stator Drive), etz Bd. 108 (1987) Heft 9, pp. 379–381. (month unknown).

Hellinger R. et al., "Langstatorantrieb Transrapid: Dimensionierung und Optimeirung,"ELEKTRIE Bd. 48, Jan. 1994, pp. 436–443.

*Primary Examiner*—Nestor Ramirez
*Attorney, Agent, or Firm*—Kenyon & Kenyon

[57] ABSTRACT

The present invention relates to a method for switching over the current between successive stators of a railway system comprising a track and a vehicle and with a long-stator linear motor. The method according to the present invention proceeds from a conventional double-infeed step-change method. During the switching over of the current from one stator section of a long-stator winding phase to the following one, the section cable, which is assigned to the stator sections to be changed over and is supplied with power from two substations by double infeed, is split up. In this way, the sections to be changed over can be supplied by single infeed by a single substation in each case. It is possible thereby to avoid the unilateral loss of thrust which occurs in the case of conventional step-change methods.

10 Claims, 4 Drawing Sheets

SECTION SWITCHING PROCESS FOR RAILWAY SYSTEMS WITH A LONG STATOR LINEAR MOTOR

FIELD OF THE INVENTION

The present invention relates to a method for section-changing for railway systems having a long-stator linear motor.

BACKGROUND INFORMATION

In railway systems having long-stator linear motors, for example magnetic-levitation transport systems, the stator winding is arranged in the form of at least one rail-like phase along the travel path or track. The secondary part, cooperating with the long stator, thus with the primary part of a linear motor, and corresponding to the rotor of a conventional electric motor, is located on the vehicle, which moves along the travel path. There are railway systems with only one winding phase. However, the subject matter of the present invention is railway systems in which there are two winding phases arranged in parallel. For reasons of efficiency and of power requirements, the individual winding phases are usually subdivided into a plurality of stator sections (hereinafter referred to as sections) The individual sections are seperated from one another electrically and are supplied with current only when a vehicle travels over them. In order to permit continuous movement of the vehicle along the travel path, the current must be switched from a section no longer needed to the next following section of a winding phase. Because of the high voltages, this changeover of the sections must be effected at zero current. Switching over the current from one section to the section following next in the direction of travel is carried out in principle, such that initially the current of the presently active section is adjusted down, i.e., is reduced to zero. When the said section is in the currentless state, it is possible to change over to the next section and then the current is adjusted up again to its original value. Consequently, only a reduced thrust is available for driving the vehicle during the times of upward and downward adjustment. The sections are completely de-energized during the changeover or switch-actuating phase, so that no thrust at all is available. In order to avoid a complete loss of thrust, in the case of the railway systems under discussion, a second long stator or a second winding phase is present which is likewise subdivided into individual sections. The sections of the second winding phase are arranged offset relative to the sections of the first winding phase, so that the sectioning point between the successive sections of the one winding phase is overlapped by a section of the other respective winding phase. Various conventional section-changing methods are used for switching over the driving current.

In the so-called three-step method, a total of three section cable systems run along the travel path. The section cables of a drive region of the travel path are supplied with current from one substation (single infeed) or from two substations (double infeed). The sections of a winding phase which are needed in each case to drive the vehicle are continuously electrically connected to the section cables. Normally, i.e., when no section change is to be made, only two mutually opposite sections of the one and of the other winding phase or, viewed in the direction of travel, of the left and of the right winding phases, are active. Before a vehicle travels over a sectioning point between two successive sections, the section following the sectioning point is switched in. Thus, during the section change, the full electric power or full thrust is available. After the sectioning point has been traveled over, the section situated in advance of the sectioning point and no longer needed to drive the vehicle is switched off again. The disadvantage of this method resides principally in the high "hardware outlay". Three section cables and at least three converters must be provided in a substation. In another method, the so-called alternating-step method, which is described in, for example, from the article entitled *"Energieversorgung des Langstatorantriebs"* (POWER SUPPLY OF THE LONG-STATOR DRIVE) in the journal "etz" volume 108 (1987) issue 9, pages 378 to 381, only two section cables are present. Since a third section cable is lacking, but three sections are simultaneously traveled over during the section change, one of the three sections must always remain de-energized, which leads to a maximum thrust dip of 100% of the winding phase affected. The cause of this thrust dip is that during the section change described above, the sections to be changed over are completely de-energized during the changeover phase, and only the section of the other winding phase which overlaps the sectioning point is active. This has a negative effect on traveling comfort in the form of jerking, and causes system fluctuations in the supply system of the substations.

It is an object of the invention to reduce the thrust dip when working with an alternating-step method.

The starting point in achieving the set objective was double-infeed railway systems. In the case of double infeeding, the section cable of a drive region is supplied with power from two substations which are arranged at the ends of the section cable. A converter is present in each substation for each section cable. The basic idea of the present invention consists in splitting a double-infeed section cable electrically into two subphases during a section change, the one subphase being supplied with power from one substation and the other subphase being supplied from the other substation in single infeed. At the time of the section change, there is then a total of three voltage sources available for the three sections simultaneously being traveled over during a section change. Owing to the splitting up of the one cable section, the two substations deliver only half the electric power to the two sections to be changed over (compared to the full power in the case of double infeeding), with the result that in total only 150% of the electric power or of the maximum possible thrust of 200% is available.

DETAILED DESCRIPTION

Figure 1:
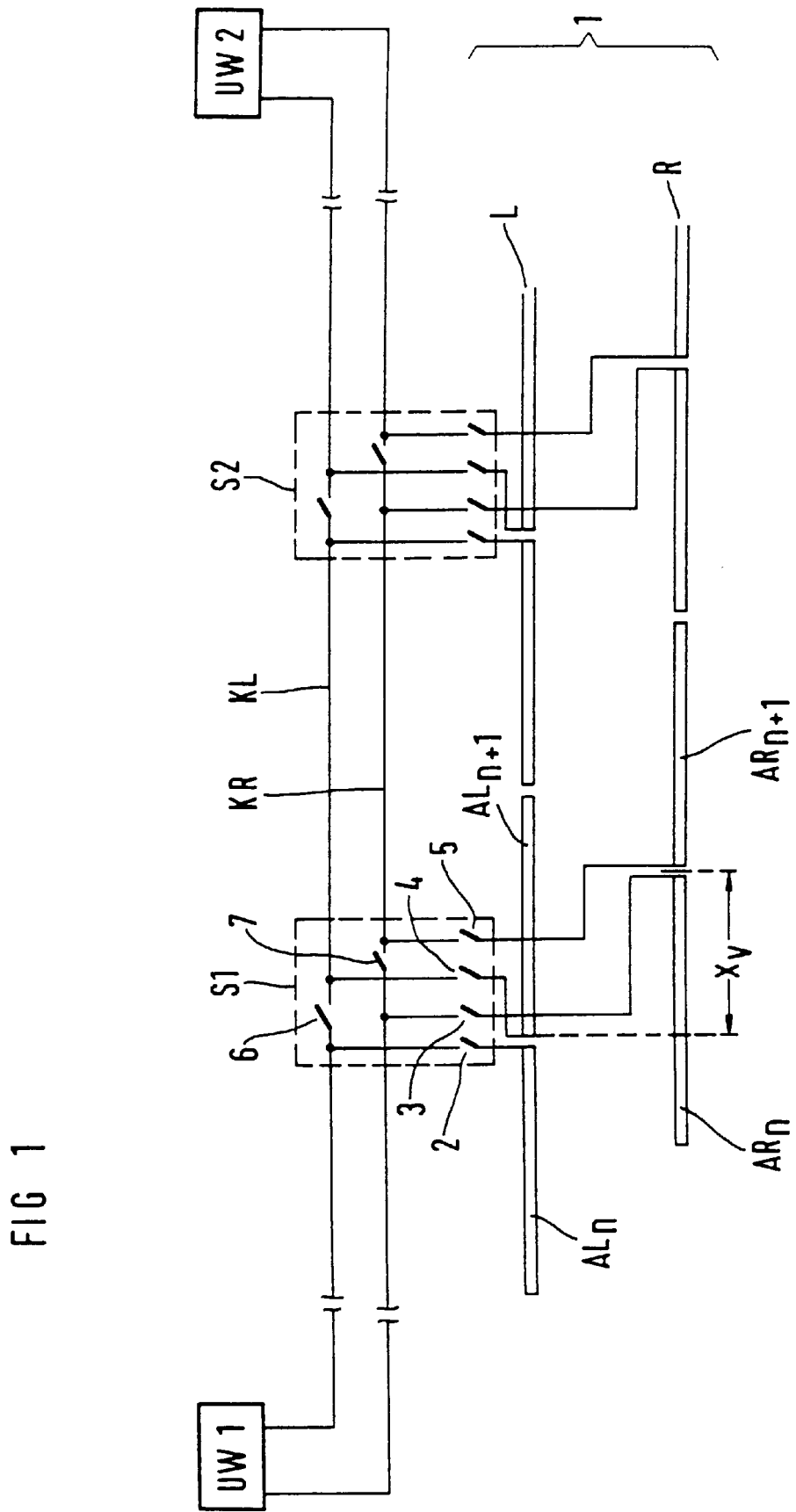
FIG. 1 shows an illustration which depicts a simplified representation of a drive region of a travel path.
Figure 3:
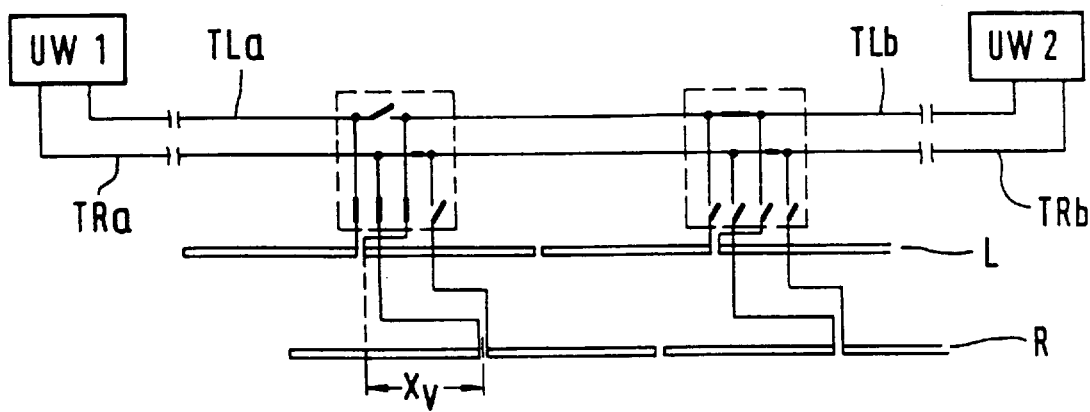
FIG. 3 shows a second step for the section change in accordance with the present invention.
Figure 4:
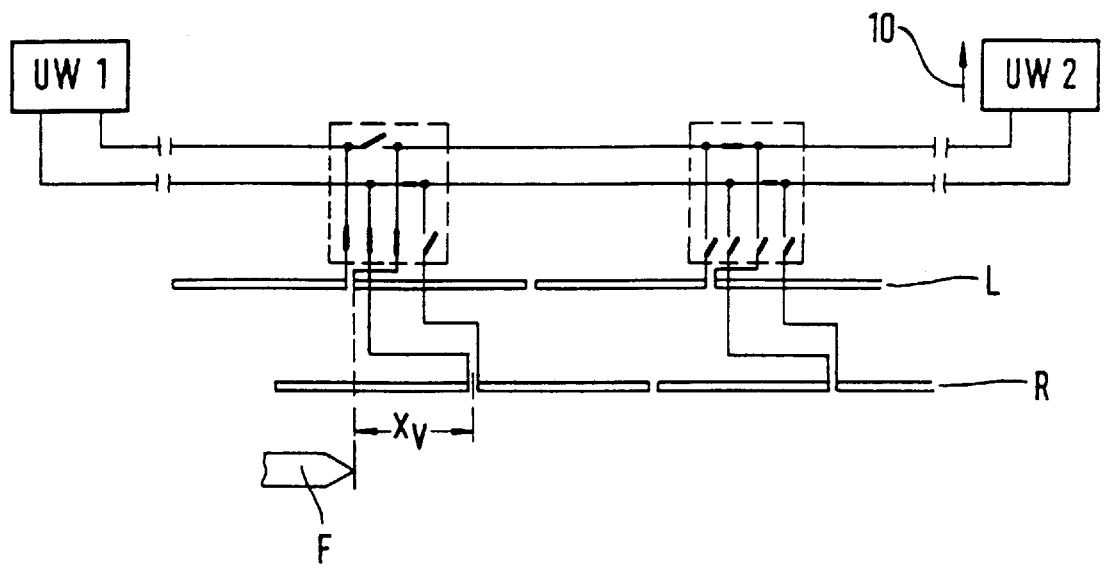
FIG. 4 shows a third step for the section change in accordance with the present invention.
Figure 5:
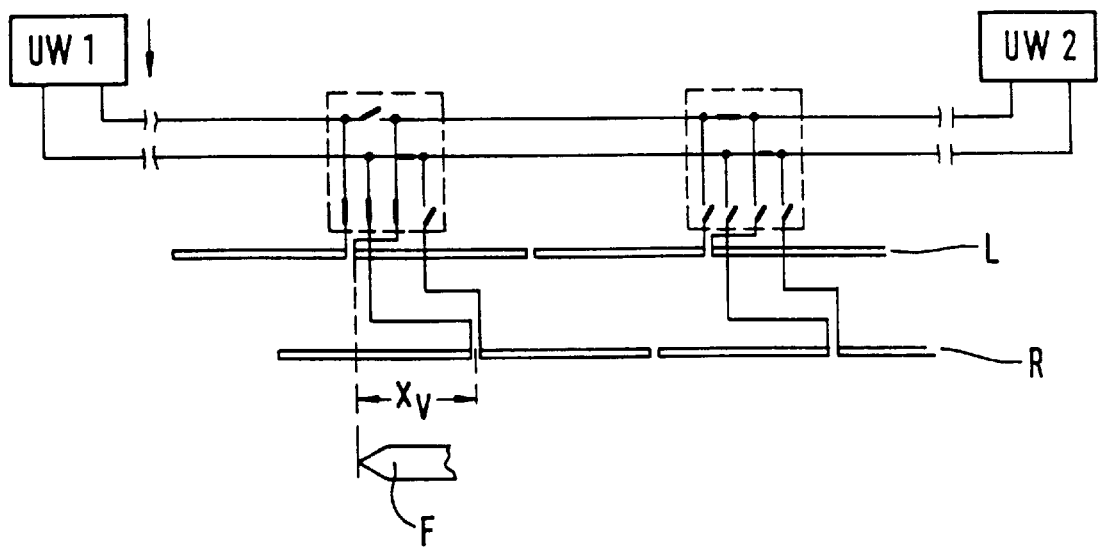
FIG. 5 shows a fourth step for the section change in accordance with the present invention.

As shown in FIG. 1, a left winding phase L and a right winding phase R are arranged along a travel path 1. Winding phases L and R are subdivided into individual stator sections (hereinafter referred to as "sections"), $AL_n$, $AL_{n+1}$, ... etc. and sections $AR_n$, $AR_{n+1}$... etc. which can be separately supplied with power. Two section cables KL and KR are arranged along travel path 1. The said sections are connected via connecting cables to the section cables assigned to them. These electrical connections can be interrupted in each case by a feed switch. Sections AR of right winding phase R are offset by an offset $x_v$ with respect to sections AL of left winding phase L. Four of the feed switches 2–5 are combined in each case to form a group in a common switching point. Each switching point is assigned a first pair of successive sections $AL_n$, $AL_{n+1}$ of the one winding phase L, and a second pair of successive sections $AR_n$ and $AR_{n+1}$ of the other winding phase R that are arranged offset relative to the first pair. Two switching points S1 and S2 are shown by way of example in FIG. 1. Located in each switching point are four feed switches—feed switches 2, 3, 4, 5 in switching point S1—feed switches 2, 3 being assigned to a pair of successive sections $AL_n$, $AL_{n+1}$ of left winding phase L, and switches 4, 5 being assigned to a pair of successive sections $AR_n$, $AR_{n+1}$ of right winding phase R. Also located in the switching points are coupler circuit-breakers 6, 7, by which section cables KL and KR can in each case be separated electrically into subphases TLa, TLb, TRa, TRb (as shown in FIG. 3). Arranged at the ends of section cables KL and KR are two substations UW 1, UW 2 which supply section cables KL and KR, or winding phases L and R assigned to them, with current along the lines of a double infeed.

The sequence of the method according to the invention may be seen from FIGS. 2–7 and from diagram D1. For the sake of clarity, the components required for carrying out the method are provided with reference symbols only in FIGS. 1–2. The positions of a vehicle which are correlated with a specific method step are specified in diagram D1 by X1, X2, etc.

Figure 2:
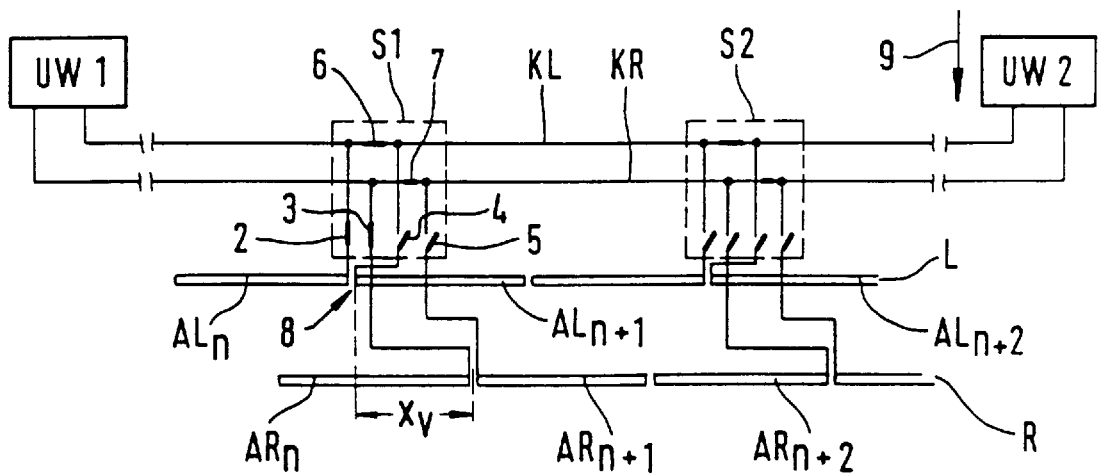
FIG. 2 shows a first step for a section change in accordance with the present invention.

As shown in FIG. 2, before a vehicle F has reached a specific monitored point X1 of the travel path which is situated in advance of sectioning point 8, the two sections $AL_n$ and $AR_n$, are supplied with current. Feed switches 2, 3 of switching point S1 are closed. Current can flow via appropriate connecting lines from section cable KL to section $AL_n$, and from section cable KR to section $AR_n$. In this case, the current is supplied in the manner of a double infeed from a converter (not shown) of substation UW 1 and a converter (not shown) of substation UW 2. In order to permit double infeeding, coupler circuit-breaker 6 in section cable KL is closed. The same holds true for coupler circuit-breaker 7 in section cable KR, into which substations UW 1 and UW 2 likewise feed current. The said sections are thus active. In each case, the vehicle is arranged with its entire length within the said sections. The full thrust (2×100%=200%) is thus available for driving the vehicle.

Once the vehicle has reached point X1, the current of one substation, in the present case substation UW 2, is adjusted down to the value zero. This operation is symbolized by arrow 9 in FIG. 2. The current in the other substation UW 1 remains unchanged. When adjusting the current downward, and later when adjusting it up, care is taken that a maximum permissible jerk, i.e., a maximum permissible negative or positive change in acceleration of the vehicle, is not exceeded (rate-of-change limiting). Thus, compared to a conventional alternating-step method, none of the sections participating in the section change is switched completely de-energized, but rather the current infeed is reduced only to 50% as long as the corresponding section is still interacting with the vehicle. Consequently, there is only a thrust reduction of 50% in the section affected, compared to a thrust reduction of 100% in the case of the conventional alternating-step method. Since the second traveled-over section $AR_n$ of winding phase R is fully activated, the overall result at X2 is a thrust of the two sections $AL_n$ and $AR_n$ of 150%. As still to be shown, this value does not decrease during the further progress of the section change.

As the next method step, coupler circuit-breaker 6 is opened and section cable KL is electrically separated into two subphases TLa and TLb (shown in FIG. 3). Feed switch 4 is closed, as a result of which section $AL_{n+1}$ is connected to substation UW 2 via subphase TLb. After the closure of feed switch 4, the current in substation 2 is adjusted up again to its original value (arrow 10 in FIG. 4). At the end of this upward-adjustment operation, vehicle F has reached position X4. It is still located with its entire vehicle length within section $AL_n$, which is supplied with current via subphase TLa from substation UW 1 (single infeed). On the other hand, section $AL_{n+1}$ adjoining sectioning point 8 is supplied in single infeed from substation UW 2.

In the further course, vehicle F shown in (FIG. 4) enters the area of action of section $AL_{n+1}$ and leaves preceding section $AL_n$ to the same extent, there being a decrease in its vehicle length which is active with respect to section $AL_n$, and in its vehicle length which is active with respect to section $AL_{n+1}$. The thrust produced in cooperation with section $AL_n$ thus decreases continuously, and the thrust produced in cooperation with section $AL_{n+1}$ increases steadily (compare subdiagram D 1.3). At point X5 or $x_m$, at which half the vehicle has passed sectioning point 8, the said thrust components are of the same magnitude. Overall, the thrust remains constant when sectioning point 8 is traveled over. Together with the thrust, a total thrust of likewise 150% results between X4 and X6 of section $AR_n$.

Figure 6:
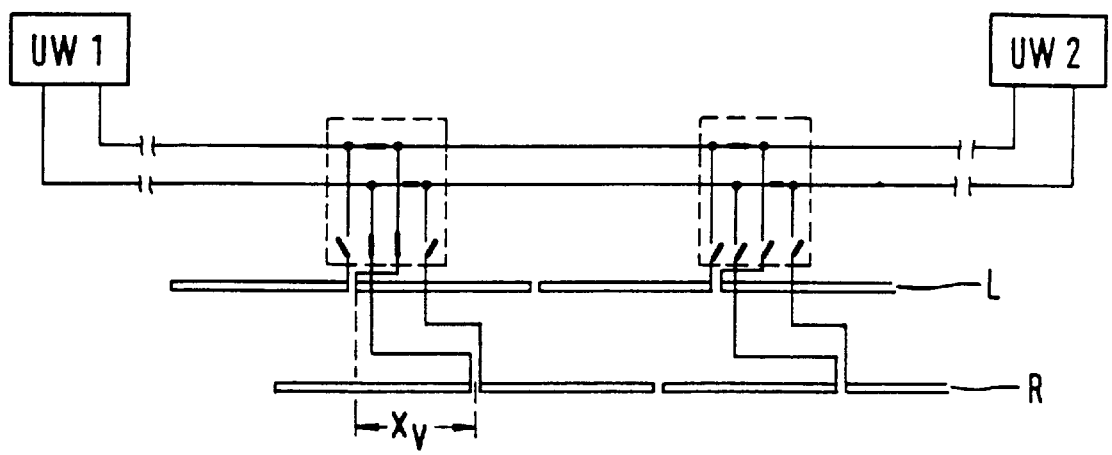
FIG. 6 shows a fifth step for the section change in accordance with the present invention.
Figure 7:
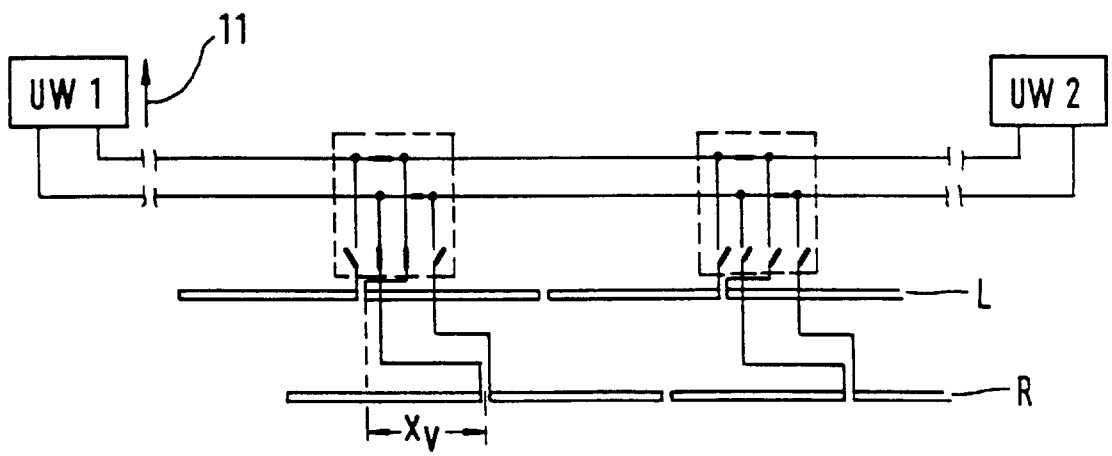
FIG. 7 shows a sixth step for the section change in accordance with the present invention.

When the vehicle has completely left section $AL_n$ (position X6), the current is adjusted down in substation UW 1. At the end of the downward adjustment operation, section $AL_n$ is de-energized. Vehicle F shown in (FIG. 5) is located with its rear end at position X7. Section $AL_n$, which has become de-energized, is separated from subphase TLa by opening switch 2, and coupler circuit-breaker 6 is closed (as shown in FIG. 6). Actuating the said switches takes a certain time, so that vehicle F is now located with its rear end at position X8. The two subphases TLa and TLb are now connected to one another again. The current in substation 1 is adjusted upward (symbolized by arrow 11 in FIG. 7). At the end of this upward adjustment operation, vehicle F is located with its rear end at position X9. Section $AL_{n+1}$ is now supplied again from both substations UW 1 and UW 2 (double infeeding). The two active sections $AL_{n+1}$ and $AR_n$ are fully activated, and consequently the full thrust of 200% is effective again in each section (compare D 1.2 and D 1.3).

A state has now been reached as at the start of the section change. The sections which are to be changed over next are sections $AR_n$ and $AR_{n+1}$. To initiate the imminent section change, the converter supplying section cable KR is driven down, that is to say the current fed on the one side from substation UW 1 into section cable KR is reduced to zero. Next, coupler circuit-breaker 7 is opened and feed switch 5 is closed. Section $AR_{n+1}$ is then connected to substation UW 2 via subphase TRb. A new section change can then begin, which proceeds analogously to that described above.

The minimum section offset is to be seen in subdiagram D 1.2 or D 1.3. It results from segment $x_{ges}$ and vehicle length $1^{Fa}$. Segment $x_{ges}$ is composed of sub-segments $x_R$, $x_S$ and $x_1$. Segment $x_R$ is that segment which is traversed during the reduction, limited in rate of change, of the nominal thrust (segment between X1 and X2 as well as X8 and X9). Segments $x_s$ are the paths which are covered during the switching times, that is to say the actuating times of the switches. Finally, segments $x_1$ correspond to those segments which are covered during the times when the current in the substations is being controlled upward and downward.

A common feature of the alternating-step method according to the present invention and of the conventional alternating-step method is that at any instant of the section change, one section is not affected by the section change. Thus, the idea suggests itself to use this section to compensate for the loss in thrust of the sections to be changed over. One possibility for achieving such a thrust compensation would be to make use of unneeded power reserves which are available, for example, when driving at a steady speed. However, this possibility for compensating thrust has the disadvantage that, particularly during the acceleration phases—and generally in the case of a cost-optimized design—virtually the entire installed converter power is required, and then no current reserve is available for thrust compensation.

A further possibility consists in providing a power reserve by basically not using the entire converter current as long as no section change is performed. Such a current reserve can be provided by using more powerful converters. However, this has the disadvantage of higher investment costs. A second possibility for providing a power reserve consists in reducing the nominal current in the case of a given converter power while accepting a lowering of the thrust capacity between the section changes. In the case of the conventional alternating-step method, as outlined above, the loss in thrust is 100% in one winding phase. The extra power required for thrust compensation in the corresponding other winding phase would therefore be 100%, that is to say 100% per converter. Such a power reserve can be achieved either only by high investment costs or a reduction in the thrust capacity which is no longer tolerable. Using an alternating-step method with mixed feeding according to the present invention, the loss in thrust during the section change is only 50% in the winding phase affected. This means that the extra power to be made available is only 50%, which can, in addition, be split between three instead of two remaining converters, that is to say the extra power per converter is only 33% instead of 100%. Diagram D 2 relates to thrust compensation by reducing the nominal current to 75% between the section changes. As can be seen from subdiagram D 2.3, during the section change (position X1 to position X9), the current of section $AR_n$, which is not affected by the section change, is increased from 75% to 100%. Overall, this results in a uniform thrust of 150% in total (subdiagram D 2.3). Given a lowering of the thrust capacity of only 25% in total, a uniform thrust as in the case of a three-step method, and therefore optimum traveling comfort, is thus achieved. A further advantage is that flicker phenomena, i.e. fluctuations in current and power, are virtually prevented by the uniform system loading.

What is claimed is:

1. A method for switching over a current between successive stator sectors of a stator winding of a railway system, the railway system including a long-stator linear motor, a vehicle and a travel path, the vehicle traveling along the travel path, the travel path including a first stator winding phase and a second stator winding phase, the first stator winding phase and the second stator winding phase including sections, the sections of the second stator winding phase being offset relative to the sections of the first stator winding phase, comprising the steps of:

a) assigning a first cable section to the first stator winding phase for supplying power to the first cable section;
   b) assigning a second cable section to the second stator winding phase for supplying power to the second cable section, each of the first cable section and the second cable section being separable into two subphases via a circuit breaker;
   c) supplying current to a first end of the first cable section and a first end of the second cable section by a first substation;
   d) supplying current to a second end of the first cable section and a second end of the second cable section by a second substation; and
   e) performing a section change between a first one of the sections of the first stator winding phase and a second one of the sections of the first stator winding phase, the second one of the sections of the first stator winding phase being successive to the first one of the sections of the first stator winding phase, wherein during the section change, one of the two subphases of the first cable section is electrically connected to the first one of the sections of the first stator winding phase, and another one of the two subphases of the first cable section is electrically connected to the second one of the sections of the first stator winding phase.

2. The method according to claim 1, wherein the plurality of sections include stator sections.

3. The method according to claim 1, wherein the sections include individual windings.

4. The method according to claim 1, wherein step e) further includes the steps of:

f) before the vehicle reaches a sectioning point between a first one of the sections of the first stator winding phase and a second one of the sections of the first stator winding phase, adjusting downward current supplied by the second substation;
   g) after step f), separating the first cable section into two subphases via opening a circuit breaker, a first one of the two subphases being electrically connected to the first one of the sections of the first stator winding phase and carrying current, a second one of the two subphases being electrically connected to the second one of the sections of the first stator winding phase and being deenergized;
   h) after step g), adjusting upward current in the second substation;
   i) when the vehicle leaves the first one of the sections of the first stator winding phase, de-energizing the first one of the sections of the first stator winding phase by adjusting downward current supplied by the first substation;
   j) after step i), electrically joining the two subphases of the first cable section by closing the circuit breaker; and
   k) after step j), adjusting upward current supplied by the first substation; and
   l) during an entire duration of step e), supplying one of the sections of the second stator winding phase with current from both the first substation and the second substation, the one of the sections of the second stator winding phase being arranged offset relative to the first one of the sections of the first stator winding phase and the second one of the sections of the first stator winding phase.

5. The method according to claim 4, wherein step h) is completed one of at and before a time when a front end of the vehicle has reached the sectioning point.

6. The method according to claim 1, further comprising the steps of:

assigning the first one of the sections of the first stator winding phase, the second one of the sections of the first winding phase, the one of the sections of the second stator winding phase, and a second one of the sections of the second stator winding phase a common switching point, the common switching point including two coupler circuit breakers assigned to the first section cable and the second section cable, and further including four feed switches for controlling an infeed of current into the first one of the sections of the first stator winding phase, the second one of the sections of the first winding phase, the one of the sections of the second stator winding phase, and the second one of the sections of the second stator winding phase, the first one of the sections of the second winding phase and the second one of the sections of the second winding phase being offset relative to the first one of the sections of the first winding phase and the second one of the sections of the first winding phase.

7. The method according to claim 1, wherein the first one of the sections of the first stator winding phase and the second one of the sections of the first stator winding phase are offset from a first one of the of the sections of the second stator winding phase and a second one of the sections of the second stator winding phase by more than a length of the vehicle.

8. The method according to claim 7, wherein the first one of the sections of the first stator winding phase and the second one of the sections of the first stator winding phase are offset from a first one of the of the sections of the second stator winding phase and a second one of the sections of the second stator winding phase by as least as a much as a sum of the length of the vehicle and a length of sections traversed at a predetermined speed by the vehicle during the upward and downward adjustment of the current and during switch actuating times.

9. The method according to claim 1, further comprising the steps of:

applying a reduced nominal current to the sections of the first winding phase and the sections of the second winding phase between section changes to form a power reserve; and increasing a thrust component of at least one section of the sections of the first and second winding phases during a section change using the power reserve, the at least one section being currentless.

10. The method according to claim 9, wherein the nominal current is reduced to 75% between the section changes.

* * * * *